United States Patent [19]

Mills

[11] 3,776,750
[45] Dec. 4, 1973

[54] CARBON BLACK PELLETING PROCESS
[75] Inventor: King L. Mills, Bartlesville, Okla.
[73] Assignee: Phillips Petroleum Company, Bartlesville, Okla.
[22] Filed: May 10, 1972
[21] Appl. No.: 251,894

[52] U.S. Cl. .................................. 106/307, 23/314
[51] Int. Cl. ............................................. C09c 1/58
[58] Field of Search ....................... 106/307; 23/314

[56] References Cited
UNITED STATES PATENTS

| | | | |
|---|---|---|---|
| 2,635,057 | 4/1953 | Jordan | 106/307 |
| 2,848,347 | 8/1958 | Rushford | 106/307 |
| 2,850,403 | 9/1958 | Day | 106/307 |
| 3,005,725 | 10/1961 | Daniell | 106/307 |
| 3,186,928 | 6/1965 | Keaton et al. | 106/307 |
| 3,391,234 | 7/1968 | Walenciak et al. | 106/307 |
| 3,636,148 | 1/1972 | Slagel | 23/314 |

Primary Examiner—Delbert E. Gantz
Assistant Examiner—James W. Hellwege
Attorney—Quigg & Oberlin

[57] ABSTRACT

A two-stage process for pelleting carbon black; in the first stage, an oil-water-carbon black mixture is formed; in the second stage, an aqueous solution is added and the black is pelleted to form soft pellets.

9 Claims, No Drawings

CARBON BLACK PELLETING PROCESS

This invention relates to carbon black pelleting.

In one of its more specific aspects, this invention relates to a two-stage pelleting process which produces soft pellets which are easily broken up and dispersed in rubber.

The pelleting of flocculent carbon black by processes such as that disclosed in U.S. Pat. No. 2,848,347, the disclosure of which is incorporated herein by reference, is well known. Black is more easily handled in its pelleted form than in its flocculent form. However, because the pelleted black is frequently incorporated in rubber, pellets can be of such hardness that the subsequent dispersal of the black in the rubber in which it is incorporated is difficult. The method of this invention solves that problem by producing soft pellets which disintegrate easily. As a result, the carbon black is more easily dispersed in rubber.

According to this invention, there is provided a method for pelleting carbon black which comprises forming a first mixture comprising carbon black and an oil-water emulsion in the substantial absence of carbon black pellet formation. To this mixture an aqueous solution is then added. The resulting mixture is then agitated to pellet the carbon black.

The method of this invention is applicable to all carbon blacks, however produced, and with all conventional pelleting apparatus. The method of the invention, accordingly, possesses several advantages over former pelleting methods. In addition to producing a softer pellet, and so facilitating disintegration of the pellet and dispersal of the black in the rubber, the method incorporates in the black, as a pelleting agent, an oil which futher facilitates the dispersal of the black.

The method of this invention employs an oil-water emulsion as a first agent and an aqueous agent as a second agent.

Any oil which can be employed to form an aqueous emulsion can be used as the first agent. Preferably, the oil will be an extender oil such as those conventionally incorporated into rubber.

Any aqueous medium which acts as a pelleting agent can be used as the second agent. Preferably, the aqueous agent will comprise such aqueous pelleting agents as are conventionally employed, these including aqueous molasses solutions and the like.

In the best mode for carrying out the invention, the oil-water emulsion is dispersed throughout the black in the substantial absence of the formation of carbon black pellets. The emulsion will be comprised of from about 0.3 to about 3 pounds of oil per pound of water and the emulsion will be employed in an amount of from about 0.5 to about 2 pounds per pound of carbon black. The amount of oil in the first unpelleted mixture comprising carbon black, oil and water will be from about 0.15 to about 1.5 pound per pound of black.

After the formation of the first unpelleted mixture, water, as such, or in the form of an aqueous pelleting solution, is introduced into the mixture and the second mixture thus formed is agitated to form pellets. The amount of aqueous solution so introduced is such as to produce a second mixture containing from about 0.8 to about 2 pounds of water per pound of black.

The pelleted black can be recovered from the pelleter and dried in the usual manner, resulting in dried carbon black pellets containing oil.

The method of the present invention is compared with prior art pelleting methods in the following data. These data represent the best mode of practicing the invention in a series of runs made under substantially identical pelleting procedures except in relation to those steps pertaining to the step-wise procedure of introducing the oil and water into contact with the black. Relatedly, all pellets were dried under substantially identical conditions. All materials employed in pelleting the black were commercially available and conventional in carbon black pelleting.

Data are as follows:

| Run No. | 1 | 2 | 3 |
|---|---|---|---|
| Method | Prior Art | Invention | Invention |
| Carbon black, lb. | 4.0 | 4.0 | 4.0 |
| First Agent—Emulsion, lb. | | | |
| Extender oil | 1.93 | 1.92 | 2.28 |
| Water | 5.00 | 0.75 | 1.16 |
| Emulsifying agent | 0.11 | 0.04 | 0.04 |
| Second Agent—Water, lb. | 0 | 4.25 | 5.5 |
| Total Water, lb. | 5.0 | 5.0 | 6.16 |
| Total Oil, lb./100lb. black | 48 | 48 | 57 |
| Relative Pellet Hardness, No.18 Sieve Fraction, Lb. to break | 80 | 66 | 63 |

Comparison of runs 1 and 2 indicates that when employing substantially identical quantities of oil and water, the method of the invention produces a softer pellet than does the method of the prior art. A comparison of runs 2 and 3, both made in accordance with the method of the invention, indicates that the method, itself, rather than the quantities of oil and water employed, is material in producing the softer pellets.

It will be evident from the foregoing that various modifications can be made to the method of this invention. Such are considered, however, to be within the scope thereof.

What is claimed is:

1. A method of pelleting carbon black which comprises:
   a forming a first mixture comprising carbon black and an oil-water emulsion in the substantial absence of carbon black pellet formation;
   b adding water to said first mixture to form a second mixture; and,
   c agitating said second mixture to form carbon black pellets.

2. The method of claim 1 in which the oil contained in said oil-water emulsion is a rubber extender oil.

3. The method of claim 1 in which said water is contained in an aqueous solution comprising molasses.

4. The method of claim 1 in which said emulsion is comprised of from about 0.3 to about 3 pounds of oil per pound of water.

5. The method of claim 1 in which said first mixture is comprised of from about 0.5 to about 2 pounds of said emulsion per pound of carbon black.

6. The method of claim 1 in which said first mixture contains from about 0.15 to about 1.5 pound of oil per pound of carbon black.

7. The method of claim 1 in which said second mixture contains from about 0.8 to about 2 pounds of water per pound of black.

8. The method of claim 2 in which said water is contained in an aqueous solution comprising molasses.

9. The method of claim 2 in which said emulsion is comprised of from about 0.3 to about 3 pounds of oil per pound of water and said second mixture contains from about 0.8 to about 2 pounds of water per pound of black.

* * * * *